United States Patent
Ramaiah et al.

(10) Patent No.: US 12,235,966 B2
(45) Date of Patent: Feb. 25, 2025

(54) SECURE MOTHERBOARD REPLACEMENT SYSTEM AND METHOD

(71) Applicant: Dell Products, L.P., Round Rock, TX (US)

(72) Inventors: Mahesh Babu Ramaiah, Bangalore (IN); Kalyani Korubilli, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 451 days.

(21) Appl. No.: 17/814,252

(22) Filed: Jul. 22, 2022

(65) Prior Publication Data
US 2024/0028732 A1    Jan. 25, 2024

(51) Int. Cl.
*G06F 21/00* (2013.01)
*G06F 21/33* (2013.01)
*G06F 21/57* (2013.01)

(52) U.S. Cl.
CPC .......... *G06F 21/575* (2013.01); *G06F 21/33* (2013.01); *G06F 2221/03* (2013.01)

(58) Field of Classification Search
None
See application file for complete search history.

(56) References Cited

U.S. PATENT DOCUMENTS

| | | | | |
|---|---|---|---|---|
| 11,977,455 | B1* | 5/2024 | Ehrlich | G06F 11/1448 |
| 2004/0039924 | A1* | 2/2004 | Baldwin | H04L 9/0891 |
| | | | | 713/189 |
| 2012/0151223 | A1* | 6/2012 | Conde Marques | ............ |
| | | | | G06F 21/6218 |
| | | | | 713/193 |
| 2012/0255017 | A1* | 10/2012 | Sallam | G06F 9/45558 |
| | | | | 726/24 |

(Continued)

OTHER PUBLICATIONS

Chhabra, Siddhartha et al. Shieldstrap: Making secure processors truly secure. 2009 IEEE International Conference on Computer Design. https://ieeexplore.ieee.org/stamp/stamp.jsp?tp=&arnumber=5413140 (Year: 2009).*

(Continued)

*Primary Examiner* — Jeremiah L Avery
(74) *Attorney, Agent, or Firm* — Fogarty LLP (57) ABSTRACT

Systems and methods for providing secure motherboard replacement techniques are described. In one embodiment, an Information Handling System (IHS) may include computer-executable instructions to, during a bootstrap process, obtain a remodeled vendor tracking certificate from a replacement motherboard in which the remodeled vendor tracking certificate comprising inventory information associated with a previous motherboard, and determine that the vendor tracking certificate includes information indicating that the replacement motherboard has replaced a previous motherboard. When it is determined that the motherboard has replaced a previous motherboard, compare the inventory (Continued)

information with one or more devices installed with the replacement motherboard such that when the comparison fails, generate an alert message indicating that an inventory associated with the previous motherboard does not match a current inventory associated with the replacement motherboard, and when the comparison succeeds, allow the bootstrap process to complete.

20 Claims, 4 Drawing Sheets

(56) References Cited

U.S. PATENT DOCUMENTS

| | | | | |
|---|---|---|---|---|
| 2014/0228005 | A1* | 8/2014 | Huang | H04M 3/42059 379/142.04 |
| 2016/0253274 | A1* | 9/2016 | Huang | G06F 13/4068 710/33 |
| 2018/0089733 | A1* | 3/2018 | Huang | G06F 16/9566 |
| 2018/0114243 | A1* | 4/2018 | Huang | G06Q 30/0631 |
| 2019/0335033 | A1* | 10/2019 | Huang | G06Q 10/30 |
| 2020/0193065 | A1* | 6/2020 | Smith | G06F 21/73 |
| 2020/0344265 | A1* | 10/2020 | Kelly | H04L 63/0823 |
| 2022/0132315 | A1* | 4/2022 | Kolekar | H04W 12/106 |
| 2022/0171648 | A1* | 6/2022 | Rodriguez | G06F 9/45533 |

OTHER PUBLICATIONS

Nam, Sangjae et al. Fast bootstrapping method for the memory-disk integrated memory system. 015 IEEE/ACIS 14th International Conference on Computer and Information Science (ICIS). https://ieeexplore.ieee.org/stamp/stamp.jsp?tp=&arnumber=7166588 (Year: 2015).*

Arbaugh, William A. et al. A secure and reliable bootstrap architecture. Proceedings. 1997 IEEE Symposium on Security and Privacy (Cat. No. 97CB36097). https://ieeexplore.ieee.org/stamp/stamp.jsp?tp=&arnumber=601317 (Year: 1997).*

* cited by examiner

SECURE MOTHERBOARD REPLACEMENT SYSTEM AND METHOD

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Networking of IHSs has in large part, facilitated distributed computing systems, such as so-called "cloud" computing systems. Within this disclosure, the term cloud computing may include systems or resources used for enabling on-demand network access to a shared pool of configurable computing resources and/or informational content that may be provisioned and released using a cloud model. A cloud model can be configured with varying characteristics, such as on-demand services, breadth of network access (e.g., accessibility), resource pooling, authorization models, and the like. Cloud based service models have become prevalent. For example, certain applications may be hosted on public and private remote systems such as clouds and usually offer a set of web based services for communicating with clients.

One particular business aspect that has benefited from cloud based service models has been customer service. Corporations have invested relatively large amounts of resources to ensure their products are readily available and that their customers receive the best service. While it is known that customer relations do not end with the sale of the product, servicing customers after the purchase of a product can also be a major challenge to the vendor or manufacturer of that product. For example, the product or a component of that product provided by the vendor may require repair and/or replacement after the product is placed in service at the customer site. It would be beneficial to the vendor to ensure that any faulty products or product component are promptly repaired and/or replaced to ensure customer satisfaction.

Inventory management systems used for tracking or otherwise managing product delivery of replacement products for customer service have involved unique product identifiers, such as Stock Keeping Units (SKUs), Universal Product Codes (UPCs), International Order Numbers (EANs), and the like that are typically affixed to the product as it is being shipped to the customer. Nevertheless, the inventors of the present case have realized that such systems often do not adequately ensure that the products or components sent to the customer are properly implemented. Accordingly, it is with these concerns in mind, among others, that embodiments of the present disclosure are presented herein.

SUMMARY

Systems and methods for providing secure motherboard replacement techniques are described. In one embodiment, an Information Handling System (IHS) may include computer-executable instructions to, during a bootstrap process, obtain a remodeled vendor tracking certificate from a replacement motherboard in which the remodeled vendor tracking certificate comprising inventory information associated with a previous motherboard, and determine that the vendor tracking certificate includes information indicating that the replacement motherboard has replaced a previous motherboard. When it is determined that the motherboard has replaced a previous motherboard, compare the inventory information with one or more devices installed with the replacement motherboard such that when the comparison fails, generate an alert message indicating that an inventory associated with the previous motherboard does not match a current inventory associated with the replacement motherboard, and when the comparison succeeds, allow the bootstrap process to complete.

According to another embodiment, a motherboard replacement method includes the steps of, during a bootstrap process, obtaining a remodeled vendor tracking certificate from a replacement motherboard, and determining that the vendor tracking certificate includes information indicating that the replacement motherboard has replaced a previous motherboard. The remodeled vendor tracking certificate including inventory information associated with a previous motherboard. The motherboard replacement method further includes the steps of, when it is determined that the motherboard has replaced a previous motherboard, comparing the inventory information with one or more devices installed with the replacement motherboard, when the comparison fails, generating an alert message indicating that an inventory associated with the previous motherboard does not match a current inventory associated with the replacement motherboard, and when the comparison succeeds, allowing the bootstrap process to complete.

According to yet another embodiment, a hardware memory device having program instructions that upon execution by a baseboard Management Controller (BMC) of an Information Handling System (IHS), cause the BMC to during a bootstrap process, obtain a remodeled vendor tracking certificate from a replacement motherboard, and determine that the vendor tracking certificate includes information indicating that the replacement motherboard has replaced a previous motherboard. When it is determined that the motherboard has replaced a previous motherboard, the instructions compare the inventory information with one or more devices installed with the replacement motherboard such that when the comparison fails, generate an alert message indicating that an inventory associated with the previous motherboard does not match a current inventory associated with the replacement motherboard. The remodeled vendor tracking certificate includes inventory information associated with a previous motherboard.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Embodiments of the present disclosure provide a secure motherboard replacement system and method that ensures replacement motherboards sent from the vendor of the motherboard are correctly deployed to replace a previous motherboard in an Information Handling System (IHS). Whereas conventional customer support mechanisms have typically used unique product identifiers (e.g., SKUs) to track replacement motherboards from the vendor to the customer site, they could not ensure proper replacement in the IHS being serviced, in large part, because the unique product identifier is not tied to the IHS being serviced. Embodiments of the present disclosure provide a solution to this problem, among others, by implementing a certificate that uniquely associates a replacement motherboard with the IHS it is supposed to be deployed in so that the replacement motherboard is not inadvertently deployed in an invalid IHS as will be described in detail herein below.

IHSs deployed at a customer site can become faulty for various reasons. In many cases, certain IHSs may be operating under a warranty that promises replacement when such faults occur. Such situations often lead to motherboard replacement, especially if it turns out to be a hardware problem. Though the vendor site may provide a replacement mother board, the work-flow involved with generating a certificate to be associated with the replacement motherboard is overly delayed, which could potentially lead to situations of customer mistrust and vulnerability. For example, scenarios exist where other peripheral devices are added and/or removed from the IHS while the replacement motherboard is in transit from factory site to the customer site. With replacement certificate generation not properly being timed, systems can operate in the compromised path until they are identified. In some cases, this scenario would require inventory checks being performed well before the IHS becomes fully operational. Additionally, situations of delayed delta certificate generation due to motherboard replacement can happen even in the middle of a service warranty, thus causing excessive downtime of the IHS and reducing customer satisfaction.

Figure 1:
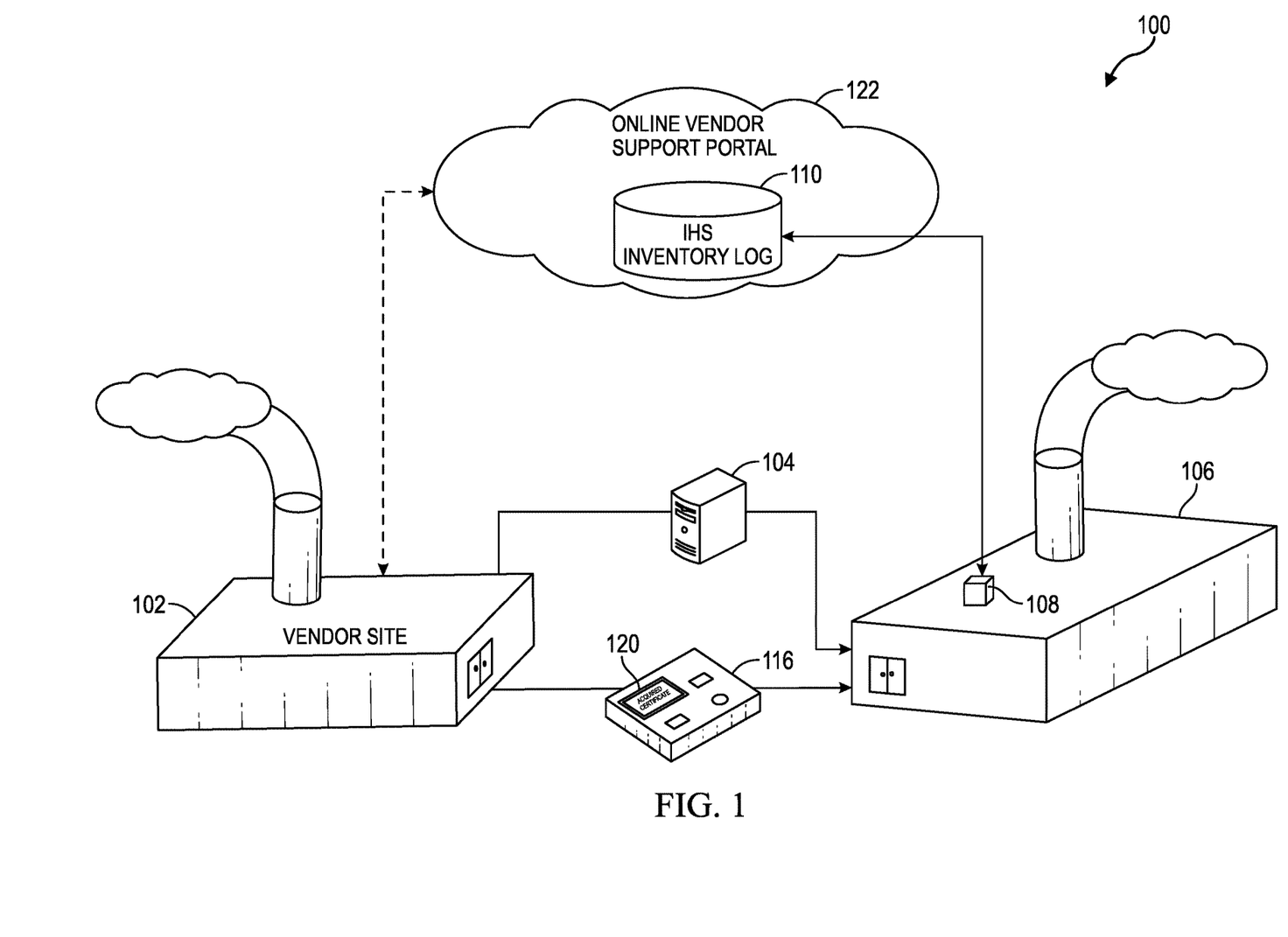
FIG. 1 illustrates an example secure motherboard replacement system that may provide a solution to the aforementioned problems with traditional customer support systems according to one embodiment of the present disclosure.

FIG. 1 illustrates an example secure motherboard replacement system 100 that may provide a solution to the aforementioned problems with traditional customer support systems according to one embodiment of the present disclosure. The system 100 generally involves a vendor at a vendor site 102 that provides an IHS 104 to a customer at a customer site 106. The vendor site 102 is associated with an online vendor support portal 122 managed by the vendor. The vendor support portal 122 may be, for example, a support website managed by the vendor that manufactures and sells the IHS 104 to the customer.

In the event that the IHS 104 needs to have its motherboard replaced, the vendor issues a replacement motherboard 116 to the customer at the customer site 106. Before shipping the replacement motherboard, nevertheless, the vendor generates a remodeled vendor tracking certificate 120 that maps the previous motherboard entries (certificate) as against the replacement motherboard 116. In general, the remodeled certificate 120 includes a custom attribute configured during vendor programming to ensure its source of issue and authenticity. The remodeled old factory certificate is uploaded to a secure location in the replacement motherboard 116 and would set "forced verification" flag, which can be of any suitable type (e.g., hardware, firmware, etc.).

On receiving the replacement motherboard 116 at the customer site 106, all originally deployed hardware devices may be reassembled. As part of a UEFI boot up process, all necessary inventory shall be collected and streamed to a Baseboard Management Controller (BMC) to execute "forced verification" process, cutting short all normal execution procedures. With the IHS being in a secure and forced-verification mode, the BMC may access the restamped old inventory from remodeled vendor tracking certificate 120 stored in the secured location and compare against the newly discovered inventory. In case of new, different, or fewer devices being discovered at the customer site 106 during comparison, the BMC may request for certain delta certificates stored in an online inventory authorization portal, such as the DELL DIGITAL LOCKER inventory authorization portal, for further comparison. The vendor authorization portal manages the operation of an IHS inventory database 110 that securely stores inventory information about IHSs provided by the vendor. The vendor authorization portal may form, for example, a part of the online vendor support portal 122.

The above steps may also cover situations involving missing devices, when unmapped delta certificates are reported by the vendor authorization portal. For scenarios of device discrepancies, the UEFI bootstrap process shall stall the boot flow, till verification is deemed successful. In situation of validation deemed successful, the user shall follow existing replacement certificate workflow and upload a "replacement certificate" to the IHS inventory log 110 for all future verifications. Additional details of the secure motherboard verification system will be described in detail herein below.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 2:
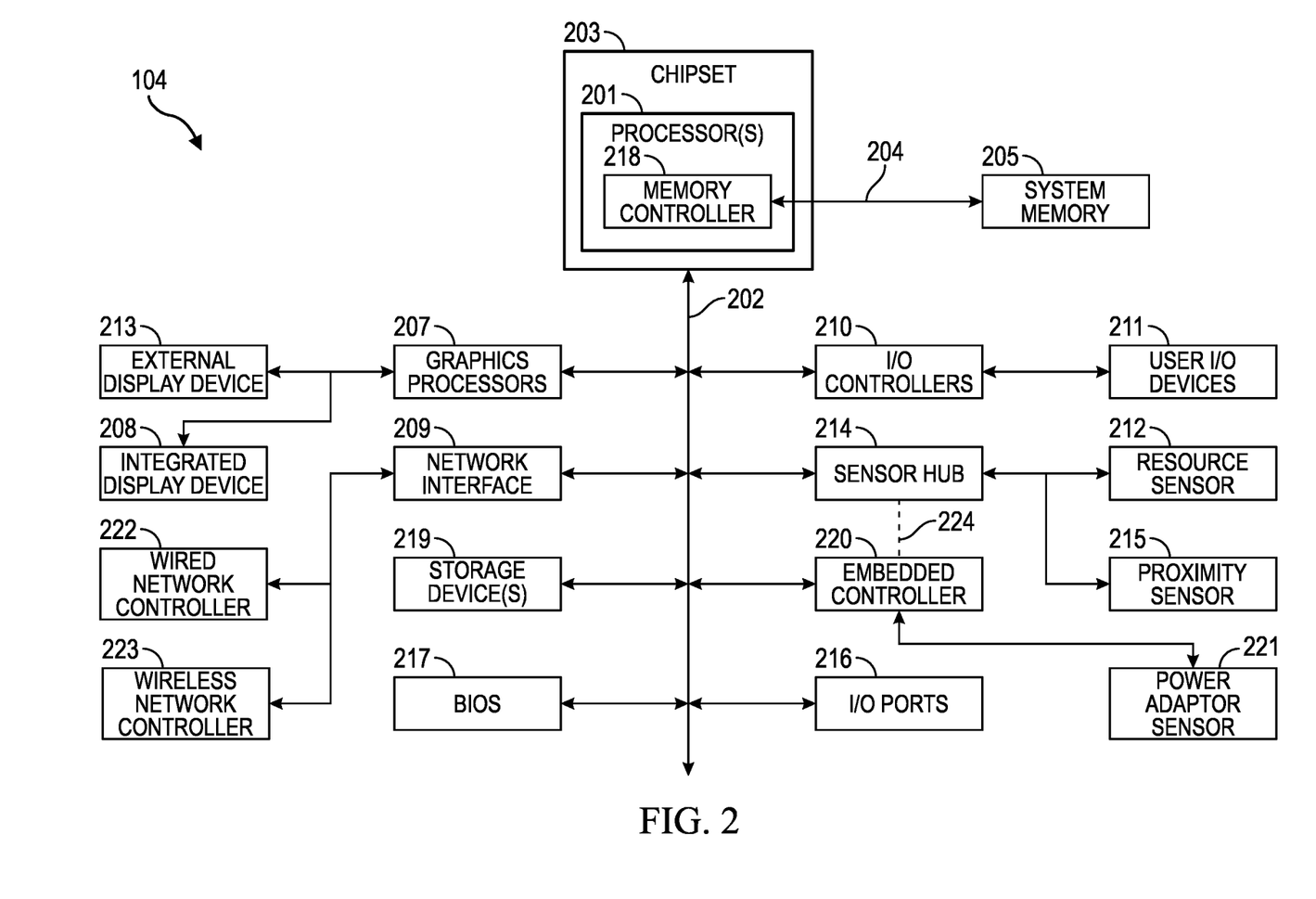
FIG. 2 is a block diagram illustrating components of an example IHS that may be configured to provide a secure motherboard replacement system according to one embodiment of the present disclosure.

FIG. 2 is a block diagram illustrating components of an example IHS 104 that may be configured to provide a secure motherboard replacement system according to one embodiment of the present disclosure. IHS 104 may be incorporated in whole, or part, as IHS 104 of FIG. 1. As shown, IHS 104 includes one or more processors 201, such as a Central Processing Unit (CPU), that execute code retrieved from system memory 205. Although IHS 104 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 104 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 104 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 104, bus 202 is illustrated as a single element. Various embodiments may utilize any number of separate buses to provide the illustrated pathways served by bus 202.

In various embodiments, IHS 104 may include one or more I/O ports 216 that may support removable couplings with diverse types of external devices and systems, including removable couplings with peripheral devices that may be configured for operation by a particular user of IHS 104. For instance, I/O 216 ports may include USB (Universal Serial Bus) ports, by which a variety of external devices may be coupled to IHS 104. In addition to or instead of USB ports, I/O ports 216 may include diverse types of physical I/O ports that are accessible to a user via the enclosure of the IHS 104.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 104 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 104. User I/O devices 211 may interface with an I/O controller 210 through wired or wireless couplings supported by IHS 104. In some cases, I/O controllers 210 may support configurable operation of supported peripheral devices, such as user I/O devices 211.

As illustrated, a variety of additional resources may be coupled to the processor(s) 201 of the IHS 104 through the chipset 203. For instance, chipset 203 may be coupled to network interface 209 that may support diverse types of network connectivity. IHS 104 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support diverse types of network connectivity, such as the network connectivity utilized by IHS 104.

Chipset 203 may also provide access to one or more display device(s) 208 and 213 via graphics processor 207. Graphics processor 207 may be included within a video card, graphics card or within an embedded controller installed within IHS 104. Additionally, or alternatively, graphics processor 207 may be integrated within processor 201, such as a component of a system-on-chip (SoC). Graphics processor 207 may generate Display information and provide the generated information to one or more Display device(s) 208 and 213, coupled to IHS 104.

One or more Display devices 208 and 213 coupled to IHS 104 may utilize LCD, LED, OLED, or other Display technologies. Each Display device 208 and 213 may be capable of receiving touch inputs such as via a touch controller that may be an embedded component of the Display device 208 and 213 or graphics processor 207, or it may be a separate component of IHS 104 accessed via bus 202. In some cases, power to graphics processor 207, integrated Display device 208 and/or external Display device 213 may be turned off, or configured to operate at minimal power levels, in response to IHS 104 entering a low-power state (e.g., standby).

As illustrated, IHS 104 may support an integrated Display device 208, such as a Display integrated into a laptop, tablet, 2-in-1 convertible device, or mobile device. IHS 104 may also support use of one or more external Display devices 213, such as external monitors that may be coupled to IHS 104 via distinct types of couplings, such as by connecting a cable from the external Display devices 213 to external I/O port 216 of the IHS 104. In certain scenarios, the operation of integrated displays 208 and external displays 213 may be configured for a particular user. For instance, a particular user may prefer specific brightness settings that may vary the Display brightness based on time of day and ambient lighting conditions.

Chipset 203 also provides processor 201 with access to one or more storage devices 219. In various embodiments, storage device 219 may be integral to IHS 104 or may be external to IHS 104. In certain embodiments, storage device 219 may be accessed via a storage controller that may be an integrated component of the storage device. Storage device 219 may be implemented using any memory technology allowing IHS 104 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 104 also includes Basic Input/Output System (BIOS) 217 that may be stored in a non-volatile memory accessible by chipset 203 via bus 202. Upon powering or restarting IHS 104, processor(s) 201 may utilize BIOS 217 instructions to initialize and test hardware components coupled to the IHS 104. BIOS 217 instructions may also load an operating system (OS) (e.g., WINDOWS, MACOS, iOS, ANDROID, LINUX, etc.) for use by IHS 104.

BIOS 217 provides an abstraction layer that allows the operating system to interface with the hardware components of the IHS 104. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 104 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 104 (e.g., CPU 201, GPU 207, system memory 205, etc.). In certain embodiments, sensor hub 214 may also include capabilities for determining a location and movement of IHS 104 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 104, absence from IHS 104, and/or distance from IHS 104 (e.g., near-field, mid-field, or far-field).

In certain embodiments, sensor hub 214 may be an independent microcontroller or other logic unit that is coupled to the motherboard of IHS 104. Sensor hub 214 may be a component of an integrated system-on-chip incorporated into processor 201, and it may communicate with chipset 203 via a bus connection such as an Inter-Integrated Circuit (I²C) bus or other suitable type of bus connection. Sensor hub 214 may also utilize an I²C bus for communicating with various sensors supported by IHS 104.

As illustrated, IHS 104 may utilize embedded controller (EC) 220, which may be a motherboard component of IHS 104 and may include one or more logic units. In certain embodiments, EC 220 may operate from a separate power plane from the main processors 201 and thus the OS operations of IHS 104. Firmware instructions utilized by EC 220 may be used to operate a secure execution system that may include operations for providing various core functions of IHS 104, such as power management, management of operating modes in which IHS 104 may be physically configured and support for certain integrated I/O functions.

EC 220 may also implement operations for interfacing with power adapter sensor 221 in managing power for IHS 104. These operations may be utilized to determine the power status of IHS 104, such as whether IHS 104 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 104 may not include each of the components shown in FIG. 2. Additionally, or alternatively, IHS 104 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
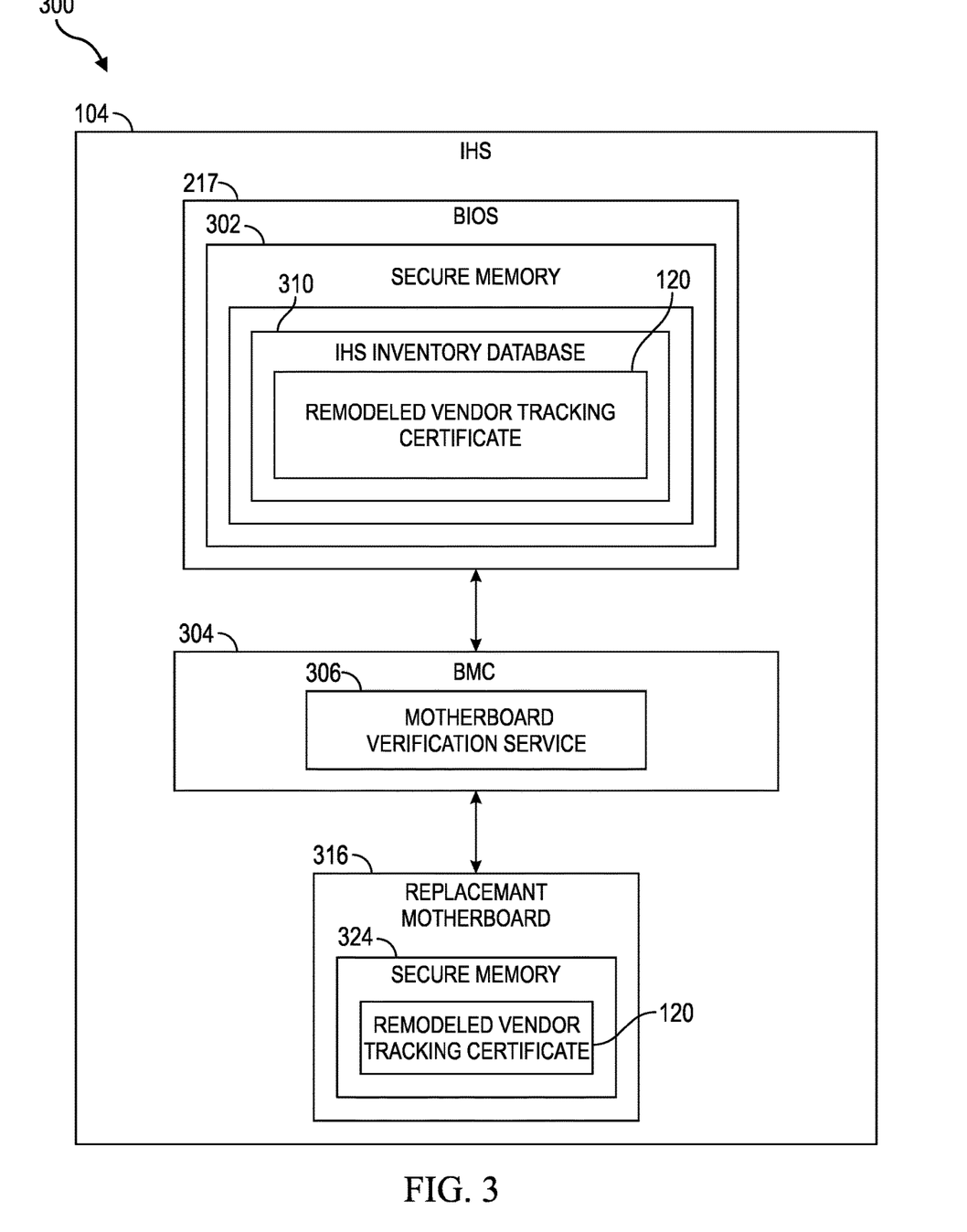
FIG. 3 illustrates several components of an example IHS that may be used to implement the secure motherboard replacement system according to one embodiment of the present disclosure.

FIG. 3 illustrates several components of an example IHS 104 that may be used to implement the secure motherboard replacement system according to one embodiment of the present disclosure. The components in the IHS 104 generally include a BIOS 217 configured with a secure memory 302, a Baseboard Management Controller (BMC) 304 that stores and executes a motherboard verification system 306, and a replacement motherboard 316 configured in the IHS 104. In one embodiment, the replacement motherboard 316 may be similar to the replacement motherboard 116 as described above with reference to FIG. 1. The secure memory 302 stores an IHS inventory database 310 for various hardware devices (e.g., NIC card, GPU, CPU, memory devices, I/O extension cards, etc.) configured in the IHS 104. In one embodiment, the BIOS 217 conforms to a Unified Extensible Firmware Interface (UEFI) specification.

The BMC 304 generally includes a specialized microcontroller embedded in the IHS, and may provide an interface between system-management software and platform hardware. Different types of sensors built into the HIS 104 report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again.

In one embodiment, when instructions in the BIOS 217 detect the replacement motherboard 316 upon starting, set a forced verification flag, which can include certain hardware and firmware checks. On receiving the replacement motherboard 316 at the customer site 106, all originally deployed hardware shall be reassembled in the IHS 104 so that verification checks for invalid peripheral devices may also be determined in certain embodiments.

In one embodiment, the motherboard verification service 306 verifies the authenticity of the replacement motherboard 316. In other embodiments, the BIOS 217 or other suitable sub-system of the IHS 104 may verify the authenticity of the replacement motherboard 316, or perform one or more actions to assist the motherboard verification service 306 in verifying the authenticity of the devices that are installed with the replacement motherboard 316. As a part of a UEFI bootstrap process, for example, all necessary inventory shall be collected and streamed to the BMC 304 to execute the forced verification process in a secure manner that operates independently of how normal execution procedures of the IHS 104 are conducted. With the IHS 104 being in secure and forced-verification mode, the BMC 304 may obtain stored registered hardware device records from the HIS inventory database 310 and compare against the newly discovered inventory. In case new devices are discovered, the BMC 304 may request historical information for other components (e.g., NIC card, etc.) from the vendor support portal 122 for further comparison. For example, the BMC 304 may access a vendor support portal 122, such as one including a DELL DIGITAL LOCKER provided by Dell Enterprises, which maintains an inventory in the form of delta certificates for some, most, or all components of IHSs provided by the vendor. In some embodiments, the instructions may also handle missing device scenarios when unmatched inventory (e.g., unmapped delta certificates) are reported by the vendor support portal 122. In some scenarios that result in device discrepancies, the BIOS 217 (e.g., UEFI boot process) may inhibit bootstrapping of the IHS 104 until verification of the replacement motherboard 316 and any peripheral devices are deemed successful. In situations in which validation is deemed successful, personnel at the customer site 106 may upload the second certificate 118 to the vendor support portal 122 for tracking the inventory of the IHS 104 by the vendor.

Figure 4:
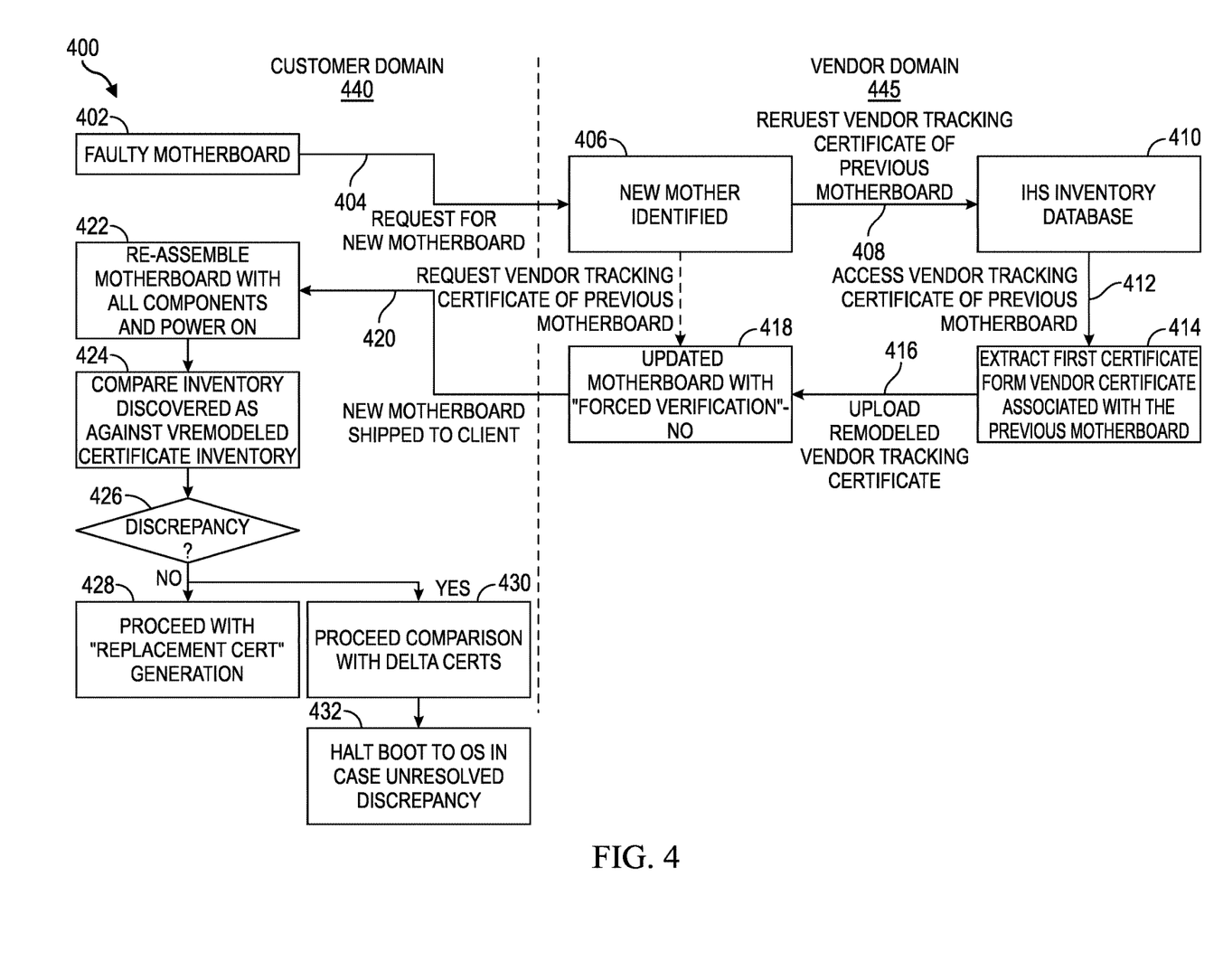
FIG. 4 illustrates an example secure motherboard replacement method that may be performed for ensuring that replacement motherboards for IHSs deployed in the field are properly replaced according to one embodiment of the present disclosure.

FIG. 4 illustrates an example secure motherboard replacement method 400 that may be performed for ensuring that replacement motherboards for IHSs deployed in the field are properly replaced according to one embodiment of the present disclosure. Additionally or alternatively, the method 400 may be performed in whole or in part by the motherboard verification service 306, the BIOS 217 of the IHS 104, or a combination thereof. For example, the BIOS 217 or BMC 304 of the IHS 104 may be configured with executable instructions stored in a memory of the BIOS 217 or BMC 304 for performing the various features of the secure motherboard replacement method 400 described herein below.

Initially the IHS 104 is deployed at a customer site 106. At some point during the operation of the IHS 104, the motherboard fails at step 402. Thereafter at step 404, the customer within the customer domain 440 issues, to the vendor from within the vendor domain 445, a request for a replacement motherboard to the vendor.

The method 400 may identify a suitable replacement motherboard 316 at step 406. At step 408, the vendor domain 445 at the vendor site 102 may request a vendor tracking certificate associated with the previous motherboard from an IHS inventory database 310 that maintains information about the components of IHSs 104 provided by the vendor for its customers. For example, the IHS inventory database 310 may include a DELL DIGITAL LOCKER database provided by DELL TECHNOLOGIES.

When the IHS inventory database 310 receives the request, it responds by sending the vendor tracking certificate associated with the previous motherboard to the vendor domain 445 at step 412. The vendor domain 445 then at step 414 extracts inventory information about the previous motherboard from the vendor tracking certificate. Then at step 416, the vendor domain 445 generates a remodeled vendor tracking certificate, and stores it in the secure memory 324 of the replacement motherboard 316.

At step 418, the vendor domain 445 includes the remodeled vendor tracking certificate 120 that is stored in the secure memory of the replacement motherboard 316. Thereafter at step 420, the replacement motherboard 316 is shipped to the customer at the customer site 106. In one embodiment, the secure memory 324 of the replacement motherboard 316 may be included with a "forced verification" flag set to on for reasons that will be described in detail herein below.

At the customer domain 440, the IHS 104 is re-assembled with all of its components (e.g., NIC card, GPU, CPU, memory devices, I/O extension cards, etc.) along with the replacement motherboard 316 at step 422. Thereafter when the IHS 104 is re-started (e.g., bootstrapped) at step 424, the stored inventory of the IHS 104 is compared against the inventory information included in the remodeled vendor tracking certificate 120 using, for example, the motherboard verification service 306 stored in the BMC 304 or executable instructions stored in the BIOS 217. For example, the motherboard verification service 306 may access inventory records of the IHS 104 to determine the identity of the previous motherboard 314, and compare that against the inventory information stored in the vendor tracking certificate 120 to ensure they are the same. Thus, the secure motherboard replacement method 400 may ensure that the new replacement motherboard 316 is only deployed in the IHS 104 that it is intended to go in. In one embodiment, the method 400 may determine that the replacement motherboard 316 has replaced a previous motherboard by identifying the vendor tracking certificate 120 includes information associated with both the previous motherboard and the replacement motherboard. In another embodiment, the method 400 may determine that the replacement motherboard 316 has replaced a previous motherboard 314 by recognizing that the "forced verification" flag is set to on (e.g., true).

At step 426, the method 400 determines whether a discrepancy exists between the inventory records associated with the previous motherboard 314 and those identified in the vendor tracking certificate 120. If not, processing continues at step 428 in which the remodeled vendor tracking certificate 120 are stored in the secure memory of the IHS 104 for future reference. In one embodiment, the method 400 may upload the remodeled vendor tracking certificate 120 to the IHS inventory database 310. If a discrepancy exists, however, processing continues at step 430 in which the method 400 compares the certificates (e.g., delta certificates) associated with those devices that did not match. A delta certificate generally refers to a certificate associated with a hardware device in the IHS 104 that has changed following its initial introduction. Thereafter at step 432, the method 400 inhibits (e.g., halts) bootstrapping to the Operating System (OS) because the "forced verification" flag has been set to on. For example, the method 400 may perform at least one of generating an alert message, inhibiting the IHS from being started with the replacement motherboard, sending an error notification, run the IHS at a reduced speed, log the event in a secure log such that the IHS 104 must be re-assembled with the proper motherboard and other components before it can be booted to an operational condition.

The steps of the method 400 described above may be performed each time a replacement motherboard 316 is requested from the vendor, installed in the IHS 104, and re-started to ensure that the replacement motherboard 316 is only deployed in the IHS 104 for which it is intended. Nevertheless, when use of the method 400 is no longer needed or desired, the process ends.

Although FIG. 4 describes an example method 400 that may be performed to ensure that only authorized motherboards are installed in their respective IHSs 104, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to:
      during a bootstrap process, obtain a remodeled vendor tracking certificate from a replacement motherboard, the remodeled vendor tracking certificate comprising inventory information associated with a previous motherboard;
      determine that the vendor tracking certificate includes information indicating that the replacement motherboard has replaced a previous motherboard; and
      when it is determined that the motherboard has replaced a previous motherboard:
         compare the inventory information with one or more devices installed with the replacement motherboard;
         when the comparison fails, generate an alert message indicating that an inventory associated with the previous motherboard does not match a current inventory associated with the replacement motherboard; and
         when the comparison succeeds, allow the bootstrap process to complete.

2. The IHS of claim 1, wherein the program instructions, upon execution, further cause the IHS to inhibit the replacement motherboard from exiting the bootstrap process when the comparison fails.

3. The IHS of claim 2, wherein the program instructions, upon execution, further cause the IHS to set a forced verification flag to off when the comparison succeeds.

4. The IHS of claim 1, wherein the program instructions, upon execution, further cause the IHS to, when the comparison fails:
   identify one of the devices that caused the failure;
   communicate with an online vendor support portal, to verify a delta certificate associated with the device;
   when a discrepancy exists between the delta certificate and the device, generate the alert message; and
   when no discrepancy exists between the delta certificate and the device, allow the bootstrap process to complete.

5. The IHS of claim 4, wherein the vendor support portal comprises an online inventory authorization portal.

6. The IHS of claim 5, wherein the program instructions, upon execution, further cause the IHS to, when no discrepancy exists between the delta certificate and the device, communicate with the vendor support portal to store the remodeled vendor tracking certificate in the online inventory authorization portal.

7. The IHS of claim 1, wherein the program instructions are executed by a Baseboard Management Controller (BMC) configured in the IHS.

8. The IHS of claim 1, wherein the program instructions, upon execution, further cause the IHS to, when the comparison fails, perform at least one of inhibiting the IHS from being started with the replacement motherboard, sending an error notification, running the IHS at a reduced speed, logging the event in a secure log.

9. A method comprising:
   during a bootstrap process, obtaining a remodeled vendor tracking certificate from a replacement motherboard, the remodeled vendor tracking certificate comprising inventory information associated with a previous motherboard;

determining that the vendor tracking certificate includes information indicating that the replacement motherboard has replaced a previous motherboard; and when it is determined that the motherboard has replaced a previous motherboard:

comparing the inventory information with one or more devices installed with the replacement motherboard;

when the comparison fails, generating an alert message indicating that an inventory associated with the previous motherboard does not match a current inventory associated with the replacement motherboard; and     when the comparison succeeds, allowing the bootstrap process to complete.

10. The method of claim 9, further comprising inhibiting the replacement motherboard from exiting the bootstrap process when the comparison fails.

11. The method of claim 10, further comprising setting a forced verification flag to off when the comparison succeeds.

12. The method of claim 11, further comprising, when the comparison fails:

identifying one of the devices that caused the failure;

communicating with an online vendor support portal, to verify a delta certificate associated with the device; and     when a discrepancy exists between the delta certificate and the device, generating the alert message; and     when no discrepancy exists between the delta certificate and the device, allowing the bootstrap process to complete.

13. The method of claim 12, wherein the vendor support portal comprises an online inventory authorization portal.

14. The method of claim 13, further comprising, when no discrepancy exists between the delta certificate and the device, communicating with the vendor support portal to store the remodeled vendor tracking certificate in the online inventory authorization portal.

15. The method of claim 9, wherein the program instructions are executed by a Baseboard Management Controller (BMC) configured in the IHS.

16. The method of claim 9, further comprising, when the comparison fails, perform at least one of inhibiting the IHS from being started with the replacement motherboard, sending an error notification, running the IHS at a reduced speed, logging the event in a secure log.

17. A hardware memory device having program instructions stored thereon that, upon execution by a baseboard Management Controller (BMC) of an Information Handling System (IHS), cause the BMC to:

during a bootstrap process, obtain a remodeled vendor tracking certificate from a replacement motherboard, the remodeled vendor tracking certificate comprising inventory information associated with a previous motherboard;

determine that the vendor tracking certificate includes information indicating that the replacement motherboard has replaced a previous motherboard; and     when it is determined that the motherboard has replaced a previous motherboard:

compare the inventory information with one or more devices installed with the replacement motherboard; and         when the comparison fails, generate an alert message indicating that an inventory associated with the previous motherboard does not match a current inventory associated with the replacement motherboard.

18. The hardware memory device of claim 17, wherein the program instructions, upon execution, further cause the IHS to:

inhibit the replacement motherboard from exiting the bootstrap process when the comparison fails; and     set a forced verification flag to off when the comparison succeeds.

19. The hardware memory device of claim 17, wherein the program instructions, upon execution, further cause the IHS to, when the comparison fails:

identify one of the devices that caused the failure;

communicate with an online vendor support portal, to verify a delta certificate associated with the device;

when a discrepancy exists between the delta certificate and the device, generate the alert message; and     when no discrepancy exists between the delta certificate and the device, allow the bootstrap process to complete.

20. The hardware memory device of claim 17, wherein the program instructions are executed by a Baseboard Management Controller (BMC) configured in the IHS.

* * * * *